United States Patent
Feng et al.

(10) Patent No.: US 9,239,508 B2
(45) Date of Patent: Jan. 19, 2016

(54) OPTICAL DEVICE AND DISPLAY DEVICE WITH THE SAME

(71) Applicants: BOE TECHNOLOGY GROUP CO., LTD., Beijing (CN); Chengdu BOE Optoelectronics Technology Co., Ltd., Chengdu (CN)

(72) Inventors: Yuanming Feng, Beijing (CN); Fan Li, Beijing (CN); Junrui Zhang, Beijing (CN)

(73) Assignees: BOE Technology Group Co., Ltd., Beijing (CN); Chengdu BOE Optoelectronics Technology Co., Ltd., Chengdu (CN)

( * ) Notice: Subject to any disclaimer, the term of this patent is extended or adjusted under 35 U.S.C. 154(b) by 55 days.

(21) Appl. No.: 14/106,606

(22) Filed: Dec. 13, 2013

(65) Prior Publication Data
US 2014/0168562 A1    Jun. 19, 2014

(30) Foreign Application Priority Data

Dec. 13, 2012 (CN) .......................... 2012 1 0541373

(51) Int. Cl.
*G02F 1/1335*    (2006.01)
*G02F 1/13*    (2006.01)
(Continued)

(52) U.S. Cl.
CPC    *G02F 1/29* (2013.01); *G02B 5/045* (2013.01); *G02F 1/1335* (2013.01); *G02F 1/133555* (2013.01); *G02F 1/03* (2013.01); *G02F 1/19* (2013.01); *G02F 2001/133626* (2013.01)

(58) Field of Classification Search
CPC ................. G02F 2001/133567; G02B 6/0053; G02B 5/06

USPC ....................... 349/62, 65, 200; 362/620, 626
See application file for complete search history.

(56) References Cited

U.S. PATENT DOCUMENTS

| | | | |
|---|---|---|---|
| 6,169,594 B1 * | 1/2001 | Aye et al. ....................... | 349/196 |
| 2007/0296909 A1 | 12/2007 | Nagato et al. | |
| 2010/0177025 A1 | 7/2010 | Nagata et al. | |

FOREIGN PATENT DOCUMENTS

| | | |
|---|---|---|
| CN | 1320223 A | 10/2001 |
| CN | 101681034 A | 3/2010 |

(Continued)

OTHER PUBLICATIONS

European Patent Office Communication enclosing extended European Search Report for corresponding European Patent Application No. 13195638.5. 6 pages, (Mar. 18, 2014).

(Continued)

*Primary Examiner* — Nathanael R Briggs
(74) *Attorney, Agent, or Firm* — Blakely, Sokoloff, Taylor & Zafman LLP

(57) ABSTRACT

An optical device comprises: an optical structure including a first set of prisms and a second set of prisms which engage with each other, the second set of prisms are formed from electro-optical effect material or provided with electro-optical effect material, when no electric field is applied to the second set of prisms, the first set and the second set of prisms have the same refractivity; at least one pair of electrodes being provided at two sides of the second set of prisms respectively, for generating an electric field therebetween so as to change the refractivity of the second set of prisms in the direction of the electric field; and a control unit connected to the at least one pair of electrodes and performs control to power on the electrodes or power off the electrodes, and controls the intensity of the electric field when the electrodes are powered on.

19 Claims, 3 Drawing Sheets

(51) Int. Cl.
*F21V 7/04* (2006.01)
*G02F 1/29* (2006.01)
*G02B 5/04* (2006.01)
*G02F 1/03* (2006.01)
*G02F 1/19* (2006.01)

(56) References Cited

FOREIGN PATENT DOCUMENTS

| CN | 102003658 A | 4/2011 |
| CN | 102645790 A | 8/2012 |
| JP | 09/511590 A | 11/1997 |
| KR | 10-1999-0075996 A | 10/1999 |
| KR | 10-2001-0072956 A | 7/2001 |
| KR | 10-2002-0026646 A | 4/2002 |
| KR | 10-2008-0000521 A | 1/2008 |
| KR | 10-2010-0040571 A | 4/2010 |
| WO | WO 00/63745 A2 | 10/2000 |
| WO | WO 2009/122716 A1 | 10/2009 |

OTHER PUBLICATIONS

First Office Action for corresponding Chinese Patent Application No. 201210541373.0, 15 pages (including English translation), (Sep. 4, 2014).

First Office Action for corresponding Korean Patent Application No. 10-2013-0155248, 14 pages (including English translation), (Jan. 8, 2015).

* cited by examiner

OPTICAL DEVICE AND DISPLAY DEVICE WITH THE SAME

FIELD OF THE INVENTION

The present invention relates to the field of liquid crystal display technology, and particularly to an optical device and a display device.

BACKGROUND OF THE INVENTION

Liquid crystal displays are classified into a transmissive display, a reflective display and a transflective display.

In the transmissive display, no mirror is provided on back side of the screen and light is only emitted from the backlight source, therefore, it has excellent performance in the environment with weak light or without light. However, when being outdoors in the sunshine or in strong light, the brightness of backlight will be seriously insufficient, and in this case, if simply increasing the brightness of the backlight to improve the performance of the display, the power consumption will increase quickly and the effect is not desired.

The reflective display has a mirror at the backside of its screen and displays relying on an external light source, thus better display effect and contrast may be realized outdoors and in strong light. However, it is difficult for the reflective display to display images with high contrast and color quality in a case of high resolution, especially difficult to meet the full color requirements. When the ambient light is insufficient, the contrast and brightness of the reflective display will greatly deteriorate.

Currently, a conventional transflective display is designed by combining designs of the transmissive display and the reflective display, that is, the conventional transflective display comprises both a backlight source and a mirror, therefore, when operating, the transflective display may use not only the backlight source of its own but also an external light source, thus better viewing effect may be provided to users no matter in strong light or in darkness. However, in the conventional transflective display, a layer of reflective material is coated on half area of each pixel so that one half of each pixel is used for transmission and the other half of each pixel is used for reflection, therefore, utilization of each pixel of the conventional transflective display is only half of that of the reflective display or the transmissive display, which leads to low utilization of light energy. Furthermore, in the conventional transflective display, as it is necessary to coat part of each pixel for reflection with reflective material, thus pixel structure is changed and fabricating process thereof becomes more complex accordingly.

SUMMARY OF THE INVENTION

One object of the invention is to provide an optical device and a display device, so as to solve the problem of low utilization of light energy and complex fabricating process in which pixel structure needs to be changed, in the conventional transflective display.

The object is realized by following solutions:

An embodiment of the invention provides an optical device comprising an optical structure, at least one pair of electrodes and a control unit, the optical structure includes a first set of prisms and a second set of prisms which engage with each other, the second set of prisms are formed of electro-optical effect material or provided with electro-optical effect material, and when no electric field is applied to the second set of prisms, the first set of prisms and the second set of prisms have same refractivity;

the at least one pair of electrodes are provided at two sides of the second set of prisms respectively, for generating an electric field therebetween so as to change the refractivity of the second set of prisms in the direction of the electric field; and the control unit is connected to the at least one pair of electrodes and performs control so as to power on the electrodes or power off the electrodes, and controls the intensity of the electric field when the electrodes are powered on.

For example, the first set of prisms and the second set of prisms include a plurality of prisms respectively, and all the prisms are the same in size and shape.

For example, the prisms are triple prisms and the cross sections thereof are isosceles right-angled triangles.

For example, the respective addendum angles of triple prisms engaging with each other are right angles.

For example, the second set of prisms, when an electric field is applied thereto, have an reflectivity in the direction of the electric field which is less than $$\frac{\sqrt{2}}{2}$$

times that of the first set of prisms.

For example, the inclined faces of all of the first set of prisms opposite to the addendum angles thereof are located in the same plane, and the inclined faces of all of the second set of prisms opposite to the addendum angles thereof are located in the same plane.

For example, the width of the second set of prisms is larger than that of the first set of prisms.

For example, end-faces are formed at both sides of the second set of prisms to be perpendicular to the plane where the second set of prisms are located and the cross sections of the triple prisms of the second set of prisms, the electrodes are attached to or provided on the end-faces respectively.

For example, each of the second set of prisms is provided with electro-optical effect material therein, the electro-optical effect material being nitrobenzene in the liquid state or blue-phase liquid crystal in the liquid crystalline state.

For example, each of the second set of prisms is formed from electro-optical effect material, the electro-optical effect material being solid potassium dihydrogen phosphate ($KH_2PO_4$) crystal.

Advantageous effects of the invention are as follows: the optical device comprises two sets of prisms, for example two sets of triple prisms, one set of triple prisms are formed from electro-optical effect material or provided with electro-optical effect material therein, through applying an electric field, refractivity of the one set of triple prisms containing electro-optical effect material in the direction of the electric field is changed, so that the optical device may be switched between a transmission mode and a total reflection mode, thus utilization of light energy may be increased.

An embodiment of the invention provides a display device comprising the above optical device.

For example, the display device comprises a liquid crystal panel which at least includes an upper substrate, a lower substrate and a liquid crystal layer interposed therebetween, the optical structure included in the optical device is located on the outer side the lower substrate, and the first set of prisms of the optical structure are bonded to the lower substrate.

Advantageous effects of the invention are as follows: the optical device is provided at the backlight side of the display panel, the optical device comprises two sets of prisms, for example two sets of triple prisms, one set of triple prisms are formed from electro-optical effect material or provided with electro-optical effect material therein, through applying an electric field, refractivity of the one set of triple prisms comprising electro-optical effect material in the direction of the electric field is changed, so that the optical device may be switched between a transmission mode and a total reflection mode, and then the display device including the optical device may be switched between a transmission mode and a total reflection mode. Furthermore, for the display device using the optical device, as it is not necessary to coat a pixel with reflective material, the whole area of the pixel is useable, and the display device may be switched between the transmission mode and the reflection mode, therefore, not only better viewing effect may be provided to users no matter it is in strong light or in darkness but also utilization of light energy may be increased. Meanwhile, as it is not necessary to coat a pixel with reflective material, thus it is not necessary to change pixel structure, and complex fabricating process is not needed.

BRIEF DESCRIPTION OF THE ACCOMPANYING DRAWINGS

The above and other features of the present invention will become more apparent by describing in detail exemplary embodiments thereof with reference to the accompanying drawings, in which.

DETAILED DESCRIPTION OF THE INVENTION

Hereinafter, the embodiments of the invention will be described in detail with reference to drawings.

An embodiment of the invention provides an optical device comprising an optical structure, at least one pair of electrodes and a control unit, the optical structure includes a first set of prisms and a second set of prisms which engage with each other, the second set of prisms are formed from electro-optical effect material or provided with electro-optical effect material, when no electric field is applied to the second set of prisms, the first set of prisms and the second set of prisms have the same refractivity; the at least one pair of electrodes are provided at two sides of the second set of prisms respectively, for generating an electric field therebetween so as to change the refractivity of the second set of prisms in the direction of the electric field; and the control unit is connected to the at least one pair of electrodes and performs control so as to power on the electrodes or power off the electrodes, and controls the intensity of the electric field when the electrodes are powered on.

For example, the first set of prisms and the second set of prisms include a plurality of prisms respectively and all the prisms are the same in size and shape.

For example, the prisms are triple prisms and the cross sections thereof are isosceles right-angled triangles, and respective addendum angles of triple prisms engaging with each other are right angles. Alternatively, the prisms may have any shape, such as Isosceles trapezoid, as long as the prisms may totally reflect the incident light.

For example, the second set of prisms, when an electric field is applied thereto, have an refractivity in the direction of the electric field which is less than $$\frac{\sqrt{2}}{2}$$

times that of the first set of prisms.

For example, the inclined faces of all prisms of the first set of prisms opposite to the addendum angles thereof are located in the same plane, and the inclined faces of all prisms in the second set opposite to the addendum angles thereof are located in the same plane.

For example, the width of the second set of prisms is larger than that of the first set of prisms.

For example, end-faces are formed at both sides of the second set of prisms to be perpendicular to the plane where the inclined faces of the second set of prisms are located and the cross sections of the prisms of the second set of prisms, the at least one pair of electrodes are attached to or provided on the end-faces respectively.

For example, the second set of prisms are provided with electro-optical effect material therein, the electro-optical effect material being nitrobenzene in the liquid state or blue-phase liquid crystal in the liquid crystalline state.

For example, the second set of prisms is formed from electro-optical effect material, the electro-optical effect material being solid potassium dihydrogen phosphate ($KH_2PO_4$) crystal.

Figure 1:
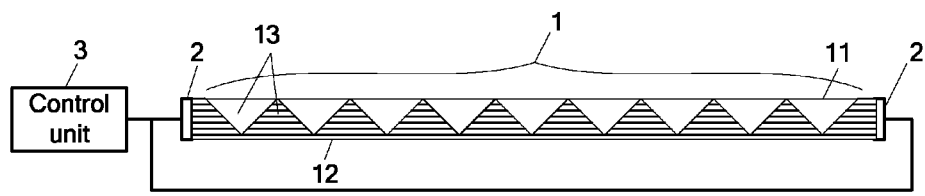
FIG. 1 is a diagram of a structure of an optical device according to a second embodiment of the invention.

The second embodiment of the invention provides an optical device. As shown in FIG. 1, the optical device includes an optical structure 1, two electrodes 2 and a control unit 3, the optical structure 1 includes a first set of triple prisms 11 and a second set of triple prisms 12 which engage with each other, the width of the first set of triple prisms 11 is smaller than that of the second set of triple prisms 12. Also, the second set of triple prisms 12 are formed from electro-optical effect material or provided with electro-optical effect material, when no electric field is applied to the second set of triple prisms 12, the second set of triple prisms 12 has the same refractivity as that of the first set of triple prisms 11.

Figure 4:
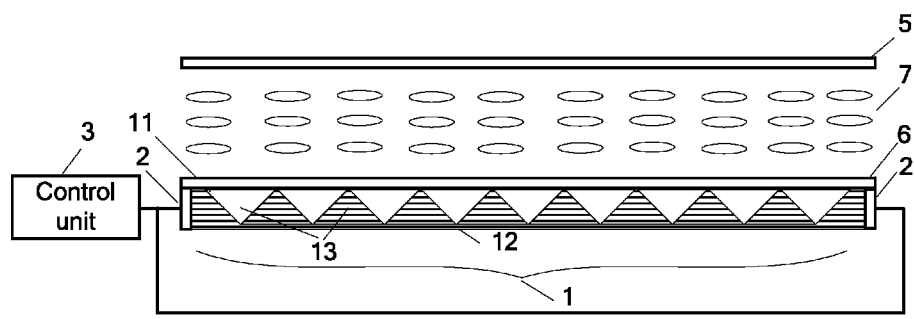
FIG. 4 is a diagram of a structure of a liquid crystal panel according to a third embodiment of the invention.

It should be understood that the width herein means a distance in the horizontal direction in FIGS. 1 and 4.

The two electrodes 2 are provided at two sides of the second set of triple prisms 12 respectively, when the two electrodes 2 are powered on, an electric field is generated therebetween, and the electric field may change the refractivity of the second set of triple prisms 12 in the direction of the electric field.

The control unit 3 is connected to the two electrodes 2 and performs control so as to power on the electrodes or power off the electrodes, and controls the intensity of the electric field when the two electrodes 2 are powered on.

Figure 5:
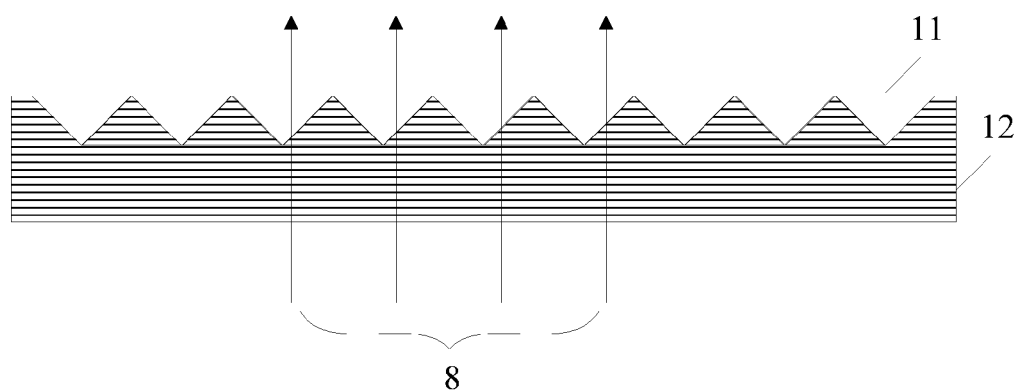
FIG. 5 is a diagram illustrating a transmission mode according to a fourth embodiment of the invention.

The optical device provided in the invention has two operation modes including a transmission mode and a reflection mode. Specifically, as stated above, when the optical device is in the transmission mode, the electrodes 2 are powered off, thus there is no electric field applied to the second set of triple prisms 12, so that the refractivity of the first set of triple prisms 11 is the same as that of the second set of triple prisms 12, light may pass through the second set of triple prisms 12 and the first set of triple prisms 11 without changing the light path (as shown in FIG. 5). When the optical device is in the reflection mode, the electrodes 2 are powered on, the refractivity of the second set of triple prisms 12 is changed, when the incident light passing through the first set of triple prisms 11 enters the second set of triple prisms 12, at least part of the incident light is reflected (as shown in FIG. 6).

For example, both the first set of triple prisms 11 and the second set of triple prisms 12 are formed by a plurality of triple prisms 13 which are the same in size and shape, and the cross sections thereof are isosceles right-angled triangles. It should be understood that the orientation of the triple prisms 13 constituting the first set of triple prisms 11 (the downward direction in FIG. 1) is opposite to that of the triple prisms 13 constituting the second set of triple prisms 12 (the upward direction in FIG. 1), so that the first set of triple prisms 11 and the second set of triple prisms 12 engage with each other.

Figure 2:
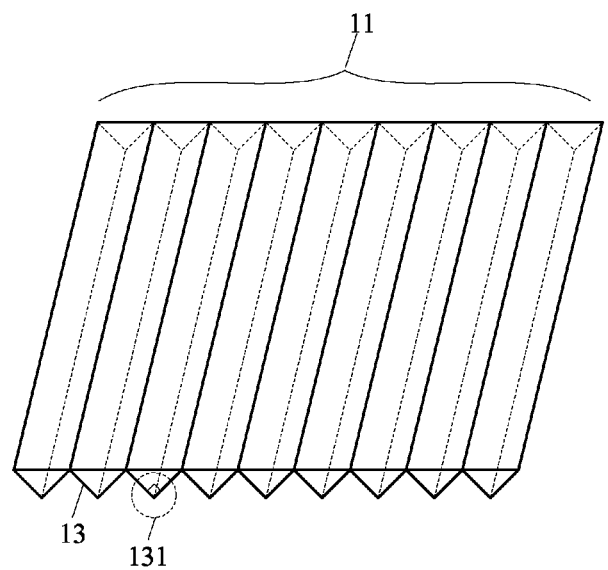
FIG. 2 is a diagram of a three-dimensional structure of a first set of triple prisms in the optical device according to the second embodiment of the invention.

FIG. 2 shows the perspective diagram of the first set of triple prisms 11. As shown in FIG. 2, the first set of triple prisms 11 are formed by a plurality of triple prisms 13 which are arranged in parallel. The first set of triple prisms 11 are indented, and the addendum angle of each of the triple prisms 13 is a right angle.

Figure 6:
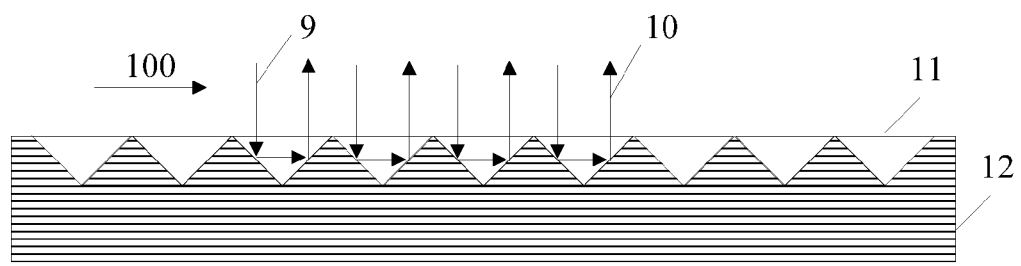
FIG. 6 is a diagram illustrating a total reflection mode according to the fourth embodiment of the invention.

The advantages of making the cross section of the triple prism 13 be an isosceles right-angled triangle is in that, as shown in FIG. 6, when a voltage is applied to the second set of triple prisms 12, the optical device enters a total reflection state, so that the incident light and the outgoing light are parallel with each other, therefore, an optimal view angle may be obtained when a viewer faces the optical device.

Figure 3:
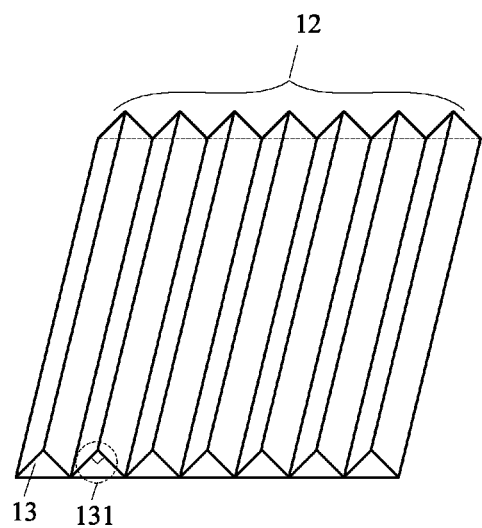
FIG. 3 is a diagram of a three-dimensional structure of a second set of triple prisms in the optical device according to the second embodiment of the invention.

FIG. 3 shows a perspective diagram of the second set of triple prisms 12. As shown in FIG. 3, the second set of triple prisms 12 are formed by a plurality of triple prisms 13 which are arranged in parallel. The second set of triple prisms 12 are indented, and the addendum angle 131 of each of triple prisms 13 is a right angle. The first set of triple prisms 11 and the second set of triple prisms 12 may engage with each other.

For example, the inclined faces of all the prisms 13 in the first set of prisms 11 which are opposite to the addendum angles 131 are located in the same plane, and the inclined faces of all the prisms 13 in the second set of triple prisms 12 which are opposite to the addendum angles 131 are located in the same plane.

For example, at both sides of the second set of triple prisms 12, there are two end-faces which are perpendicular to the plane where the inclined faces of the prisms 13 in the second set of prisms 12 are located and the cross sections of the prisms 13, and extend in the length direction of the prisms 13. Two electrodes 2 are attached to or provided on the end-faces respectively.

For example, each prism 13 in the second set of prisms 12 is formed from electro-optical effect material or provided with electro-optical effect material therein, the electro-optical effect material is characterized in that it is isotropic when no power is applied and becomes anisotropic when power is applied. The refractivity of the electro-optical effect material will change in the direction of the applied electric field.

For example, each prism 13 in the second set of prisms 12 is provided with electro-optical effect material therein, the electro-optical effect material being nitrobenzene in the liquid state or blue-phase liquid crystal in the liquid crystalline state.

For example, each prism 13 in the second set of prisms 12 is formed from electro-optical effect material, the electro-optical effect material being solid potassium dihydrogen phosphate ($KH_2PO_4$) crystal.

In addition, when incident light perpendicularly passes through the plane, where the inclined faces of the triple prisms 13 in the first set of triple prisms 11 are located, to be incident on the triple prisms 13 in the second set of triple prisms 12, if reflection is intended, the electrodes 2 need to be powered on so that an electric field is generated between the electrodes 2, thus the refractivity of the second set of triple prisms 12 in the direction of the electric field changes. In this embodiment, the necessary conditions for realizing total reflection is as follows: the refractivity of each triple prism 13 in the second set of triple prisms 12 in the direction of the electric field is equal to that of each triple prism 13 in the first set of triple prisms 11 multiplying the sine of incidence angle of the incident light. Since when the incident light is perpendicular to said plane, the incidence angle of light at the engagement surface between a triple prism 13 in the first set of triple prisms 11 and a triple prism 13 in the second set of triple prisms 12, which are adjacent to each other, is 45°, and the sine of 45° is $$\frac{\sqrt{2}}{2}.$$

In order to fully meet the conditions for realizing total reflection, the refractivity of each triple prism 13 in the second set of triple prisms 12 in the direction of the electric field should be smaller than $$\frac{\sqrt{2}}{2}$$

times that of the adjacent triple prism 13 in the first set of triple prisms 11. In the second embodiment, change in the refractivity of the second set of triple prisms 12 in the direction of the electric field is realized by adjusting the voltage applied to the electrodes.

In the present embodiment, description has been made taking the triple prisms as an example, but it is only exemplary, and the invention is not limited thereto. In fact, a first set of prisms (which correspond to the first set of triple prisms 11) and a second set of prisms (which correspond to the second set of triple prisms 12) can be constituted by prisms other than triple prisms, as long as the switch between the transmission mode and the total reflection mode can be achieved.

Advantageous effects of the invention are as follows: the optical device comprises two sets of triple prisms, one set of triple prisms are formed from electro-optical effect material or provided with electro-optical effect material therein, through applying an electric field, refractivity of the one set of triple prisms in the direction of the electric field is changed, so that the optical device may be switched between the transmission and total reflection modes thus utilization of light energy may be increased. In the case of the total reflection mode, light transmitting the first set of triple prisms 11 is totally reflected by the second set of triple prisms 12, and guided to the light incoming side after passing through the first set of triple prisms 11, so that the brightness at the light incoming side (i.e., the upper surface in FIG. 1) is increased, and thus utilization of light energy is increased.

In addition, the display device provided by the invention may be any product or part having display function such as a liquid crystal panel, a liquid crystal TV, a digital image frame, a liquid crystal display, a mobile phone, a tablet PC, electronic paper, an OLED panel etc. which includes the optical device of the invention, but is not limited to such product or part.

The third embodiment of the invention provides a display device including the above optical device. For example, the display device includes a liquid crystal panel, and as shown in FIG. 4, the liquid crystal panel at least includes an upper substrate 5, a lower substrate 6 and a liquid crystal layer 7. The optical device includes an optical structure 1, a pair of electrodes 2 and a control unit 3.

The optical structure 1 includes a first set of triple prisms 11 and a second set of triple prisms 12 which engage with each other, the second set of triple prisms 12 are formed of electro-optical effect material or provided with electro-optical effect material, and when no electric field is applied to the second set of triple prisms 12, the first set of triple prisms 11 and the second set of triple prisms 12 have the same refractivity. The optical device in the present embodiment is the same as that in the second embodiment.

As shown in FIG. 4, the two electrodes 2 are provided at two sides of the second set of triple prisms 12 respectively, when the two electrodes 2 are powered on, an electric field is generated therebetween, and the electric field may change the refractivity of the second set of triple prisms 12 in the direction of the electric field. Of course, depending on the characteristic of the electro-optical effect material forming the second set of triple prisms 12, the electric field may be generated in the direction in which refractivity needs to be changed, therefore the electrodes 2 are provided to be separated from the second set of triple prisms 12, or, the electrodes 2 may be provided on or attached to the end-faces at two sides of the second set of triple prisms 12. For example, when the electrodes 2 are provided on or attached to the end-surfaces at two sides of the second set of triple prisms 12, two end-faces which are perpendicular to the plane where the inclined faces of the prisms 13 in the second set of triple prisms 12 are located and perpendicular to the cross sections of the prisms 13, and extend in the length direction of the prisms 13 need to be provided at the both sides of the second set of triple prisms 12 respectively, and at the same time the electric field between the two electrodes 2 should be parallel to the plane where the inclined faces of the prisms in the second set of triple prisms 12 are located.

The control unit 3 is connected to the two electrodes 2 and performs control so as to power on the electrodes 2 or power off the electrodes 2, and controls the intensity of the electric field between the two electrodes 2 when the two electrodes 2 are powered on.

The optical structure 1 included in the optical device is located at the outer side of the lower substrate 6, and the first set of triple prisms 11 of the optical structure 1 are bonded to the lower substrate 6 in the manner shown in FIG. 4.

For example, as shown in FIG. 4, both the first set of triple prisms 11 and the second set of triple prisms 12 have a plurality of prisms 13, each prism 13 in the first set of triple prisms 11 and each prism 13 in the second set of triple prisms 12 are the same in size and shape, and the cross sections of the prisms 13 are isosceles right-angled triangles.

Advantageous effects of the invention are as follows: an optical device is provided at the backlight side of the display panel, the optical device comprises two sets of triple prisms, each prism in one set of triple prisms is formed from electro-optical effect material or provided with electro-optical effect material therein, through applying an electric field, refractivity of the one set of triple prisms in the direction of the electric field is changed, so that the optical device may be switched between the transmission and total reflection modes, and thus the display device with the optical device may be switched between the transmission mode and the total reflection mode. In addition, as for the display device using the optical device, as it is not necessary to coat a pixel with reflective material, the whole area of the pixel is useful, and the display device may be switched between the transmission mode and the reflection mode, therefore, not only better viewing effect may be provided to users no matter it is in strong light or in darkness but also utilization of light energy may be increased. Meanwhile, as it is not necessary to coat the pixel with reflective material, thus it is not necessary to change the pixel structure, and complex fabricating process is not needed.

Hereinafter the forth embodiment will be described in detail with reference to FIGS. 5 and 6. FIG. 5 shows a diagram of the optical device according to the invention which is in the transmission mode. As shown in FIG. 5, reference number 8 denotes light from the backlight source which is located below the second set of triple prisms 12. In a case of using the backlight source, an electric field is not applied to change the refractivity of the second set of triple prisms 12, the electro-optical effect material included in the second set of triple prisms 12 is isotropic, and at this time, the refractivity of the first set of triple prisms 11 is equal to that of the second set of triple prisms 12, so that the light 8 from the backlight source directly transmits through the second set of triple prisms 12 and the first set of triple prisms 11.

FIG. 6 shows a diagram of the optical device according to the invention which is in the total reflection mode. As shown in FIG. 6, an electric field is applied to the second set of triple prisms 12, the direction of the electric field is a direction denoted by reference number 100, and at this time the backlight source is turned off. In this case, the refractivity of the second set of triple prisms 12 is changed by the applied electric field. That is, the refractivity of the second set of triple prisms 12 in the direction denoted by the reference number 100 is changed, and when incident light 9 enters, since the refractivity of the first set of triple prisms 11 is different from that of the second set of triple prisms 12 in the direction of the electric field 100, therefore, two reflections occur where the first set of triple prisms 11 and the second set of triple prisms 12 engage with each other, as shown in FIG. 6, the direction of the outgoing light 10 and that of the incident light 9 are opposite and parallel to each other, which means that total reflection is achieved. In order to achieve the above total reflection, following conditions have to be met:

The cross sections of triple prisms 13 forming the first set of triple prisms 11 and the second set of triple prisms 12 are isosceles right-angled triangles; and the refractivity of the second set of triple prisms 12 in the direction of the electric field 100 and the refractivity of the first set of triple prisms 11 should satisfy following equation:

$$n_2 < \frac{\sqrt{2}}{2} n_0$$

Wherein $n_2$ is the refractivity of the second set of prisms 12 in the direction of the electric field in the case of applying an electric field so as to change the refractivity of the second set of prisms 12, and $n_0$ is the refractivity of the first set of prisms 11.

In the embodiments of the invention, in a display device using the optical device of the invention, when a transmission-mode display is to be realized, no electric field is applied to the second set of prisms 12, that is, the refractivity of the second set of prisms 12 is not changed by applying an electric field, and when a reflection-mode display is to be realized, an electric field is applied so as to change the refractivity of the second set of prisms 12 in the direction of the electric field, so that the refractivity of the second set of prisms 12 may meet a predetermined relationship, so as to realize total reflection.

It can be understood that the above embodiments are only exemplary embodiments used for describing the principles of the present invention, and however the present invention is not limited thereto. For persons skilled in the art, various variations and improvements can be made without departing from the spirit and the substance of the present invention, and such variations and improvements shall be deemed to be within the protection scope of the present invention.

What is claimed is:

1. An optical device comprising an optical structure, at least one pair of electrodes and a control unit, wherein
the optical structure includes a first set of prisms and a second set of prisms which engage with each other, the second set of prisms are formed from electro-optical effect material or contain electro-optical effect material, and when no electric field is applied to the second set of prisms, the first set of prisms and the second set of prisms have the same refractivity;
wherein each electrode of the at least one pair of electrodes resides on a respective one of end faces at two sides of the second set of prisms perpendicular to a plane on which the second set of prisms are located, for generating an electric field to change refractivities of the prisms of the second set in the direction of the electric field, so that light transmitted through the prisms of the first set can be totally reflected by the prisms of the second set; and
the control unit is connected to the at least one pair of electrodes and performs control so as to power on the electrodes or power off the electrodes, and controls the intensity of the electric field when the electrodes are powered on.

2. The optical device according to claim 1, wherein all prisms of the first and second sets of prisms are the same in size and shape.

3. The optical device according to claim 2, wherein the prisms are triple prisms, cross sections thereof are isosceles right-angled triangles, and addendum angles thereof are right angles.

4. The optical device according to claim 3, wherein the second set of prisms, when an electric field is applied thereto, has refractivity in the direction of the electric field which is less than $$\frac{\sqrt{2}}{2}$$

times refractivity of the first set of prisms.

5. The optical device according to claim 3, wherein inclined faces of all prisms of the first set of prisms opposite to the addendum angles thereof are located in the same plane, and inclined faces of all prisms of the second set of prisms opposite to the addendum angles thereof are located in the same plane.

6. The optical device according to claim 1, wherein width of the second set of prisms is larger than that of the first set of prisms.

7. The optical device according to claim 6, wherein end-faces are formed at both sides of the second set of prisms to be perpendicular to the plane where the second set of prisms are located and perpendicular to the cross sections of the prisms, the at least one pair of electrodes are attached to or provided on the end-faces respectively.

8. The optical device according to claim 1, wherein each prism of the second set of prisms contains electro-optical effect material therein, the electro-optical effect material being nitrobenzene in the liquid state or blue-phase liquid crystal in the liquid crystalline state.

9. The optical device according to claim 1, wherein each prism of the second set of prisms is formed from electro-optical effect material, the electro-optical effect material being solid potassium dihydrogen phosphate crystal.

10. A display device comprising an optical device comprising an optical structure, at least one pair of electrodes and a control unit, wherein
the optical structure includes a first set of prisms and a second set of prisms which engage with each other, the second set of prisms are formed from electro-optical effect material or contain electro-optical effect material, and when no electric field is applied to the second set of prisms, the first set of prisms and the second set of prisms have the same refractivity;
wherein each electrode of the at least one pair of electrodes resides on a respective one of end faces at two sides of the second set of prisms perpendicular to a plane on which the second set of prisms are located, for generating an electric field to change refractivities of the prisms of the second set in the direction of the electric field, so that light transmitted through the prisms of the first set can be totally reflected by the prisms of the second set; and
the control unit is connected to the at least one pair of electrodes and performs control so as to power on the electrodes or power off the electrodes, and controls the intensity of the electric field when the electrodes are powered on.

11. The display device according to claim 10, wherein all prisms of the first and second sets of prisms are the same in size and shape.

12. The display device according to claim 11, wherein the prisms are triple prisms, cross sections thereof are isosceles right-angled triangles, and addendum angles thereof are right angles.

13. The display device according to claim 12, wherein the second set of prisms, when an electric field is applied thereto, has refractivity in the direction of the electric field which is less than $$\frac{\sqrt{2}}{2}$$

times refractivity of the first set of prisms.

14. The display device according to claim 12, wherein inclined faces of all prisms of the first set of prisms opposite to the addendum angles thereof are located in the same plane, and inclined faces of all prisms of the second set of prisms opposite to the addendum angles thereof are located in the same plane.

15. The display device according to claim 10, wherein width of the second set of prisms is larger than that of the first set of prisms.

16. The display device according to claim 15, wherein end-faces are formed at both sides of the second set of prisms to be perpendicular to the plane where the second set of prisms are located and perpendicular to the cross sections of the prisms, the at least one pair of electrodes are attached to or provided on the end-faces respectively.

17. The display device according to claim 10, wherein each prism of the second set of prisms contains electro-optical effect material therein, the electro-optical effect material being nitrobenzene in the liquid state or blue-phase liquid crystal in the liquid crystalline state.

18. The display device according to claim 10, wherein each prism of the second set of prisms is formed from electro-optical effect material, the electro-optical effect material being solid potassium dihydrogen phosphate crystal.

19. The display device according claim 10, further comprising a liquid crystal panel which at least includes an upper substrate, a lower substrate and a liquid crystal layer interposed therebetween, wherein the optical structure included in the optical device is located at the outer side of the lower substrate, and the first set of prisms of the optical structure are bonded to the lower substrate.

\* \* \* \* \*